United States Patent
Chen

(10) Patent No.: US 10,710,171 B1
(45) Date of Patent: Jul. 14, 2020

(54) CUTTER HOLDER WITH RETENTION KNOB

(71) Applicant: SHIN-YAIN INDUSTRIAL CO., LTD., Taichung (TW)

(72) Inventor: Pen-Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/396,359

(22) Filed: Apr. 26, 2019

(51) Int. Cl.
*B23B 31/26* (2006.01)
*B23Q 3/12* (2006.01)
*B23B 31/00* (2006.01)

(52) U.S. Cl.
CPC .......... *B23B 31/265* (2013.01); *B23B 31/006* (2013.01); *B23Q 3/12* (2013.01); *B23B 2231/0296* (2013.01); *B23B 2260/138* (2013.01); *Y10T 409/30952* (2015.01)

(58) Field of Classification Search
CPC ... B23B 31/006; B23B 31/261; B23B 31/265; B23B 2231/0296; B23B 2260/138; B23Q 3/12; Y10T 409/309464; Y10T 409/30952
See application file for complete search history.

(56) References Cited

U.S. PATENT DOCUMENTS

| | | | | |
|---|---|---|---|---|
| 4,122,755 | A * | 10/1978 | Johnson | B23B 31/003 408/238 |
| 4,818,161 | A * | 4/1989 | Cook | B23B 31/006 279/900 |
| 5,593,258 | A * | 1/1997 | Matsumoto | B23B 31/006 279/103 |
| 6,360,634 | B1 * | 3/2002 | Leitch | B23B 31/006 81/124.2 |
| 7,284,938 | B1 * | 10/2007 | Miyazawa | B23B 31/006 409/231 |
| 8,998,545 | B2 * | 4/2015 | Stoneback | B23B 31/006 409/232 |
| 2016/0016235 | A1 * | 1/2016 | Chen | B23B 31/02 279/20 |

FOREIGN PATENT DOCUMENTS

| | | | |
|---|---|---|---|
| JP | 07308809 A | * 11/1995 | |
| KR | 101440822 B1 | * 9/2014 | B23B 31/006 |

* cited by examiner

*Primary Examiner* — Eric A. Gates
(74) *Attorney, Agent, or Firm* — Muncy, Geissler, Olds & Lowe, P.C.

(57) ABSTRACT

A cutter holder has a body and a retention knob connected to the body by threading. The body has a connecting hole having an internal threaded segment and a straight segment. The retention knob has a head, an abutting portion, and an external threaded portion. The abutting portion has a flange and an extending portion. The extending portion and the straight segment are in a clearance fit, and a sealing member seals the clearance between the extending portion and the straight segment. The external threaded portion is engaged with the internal threaded segment by threading, and has a first threaded segment and a second threaded segment. The first threaded segment is away from the head of the retention knob, and a tolerance class of the second threaded segment is higher than a tolerance class of the first threaded segment.

16 Claims, 7 Drawing Sheets

CUTTER HOLDER WITH RETENTION KNOB

BACKGROUND OF THE INVENTION

1. Field of the Invention

The present invention relates to a cutter holder for a machining tool, and more particularly to a cutter holder with a retention knob.

2. Description of Related Art

With reference to FIGS. 6 and 7, a conventional cutter holder 90 has a body 91 and a retention knob 92 connected to a top of the body 91 in threaded engagement. The cutter holder 90 is clamped in a spindle 80 of a machining tool and is engaged with a clamping device 81 mounted in the spindle 80. Thus, the cutter holder 90 can be driven to spin with the spindle 80 for cutting.

The conventional retention knob 92 has a head 921, a flange 922, and an external threaded segment 923. The head 912 and the external threaded segment 923 are formed respectively at opposite ends of the retention knob 92. The flange 922 is formed between the head 912 and the external threaded segment 923 and radially protrudes from the retention knob 92. The external threaded segment 923 of the retention knob 92 is engaged with an internal threaded segment 911 of the body 91. The flange 922 abuts against the top of the body 91 to fix a position of the head 921 of the retention knob 92 relative to the body 91.

The conventional thread standards include the Unified Inch Thread System and the Metric Thread System. A thread fit is a combination of allowances and tolerances and a measurement of tension or laxity between threads. Class of thread fit is a specification of how tightly mating external and internal threads will mesh. There are three classes of thread fit defined in the Unified Inch Thread System and the Metric Thread System, which are loose fit, standard fit, and close fit.

The Unified Inch Thread System defines six tolerance classes: 1B, 2B, and 3B for internal threads, and 1A, 2A, and 3A for external threads. The higher the class number, the tighter the fit. The recommended thread fit between the body 91 and the retention knob 92 is defined as the standard fit with thread tolerance classes 2A and 2B.

The tolerance classification in the Metric Thread System is the combination of a tolerance grade and a tolerance position. For internal threads there are two tolerance positions, H with a zero fundamental deviation (distance of the tolerance position from the basic site) and G with a positive fundamental deviation. For external threads there are three tolerance positions: h with a zero fundamental deviation and e and g with negative fundamental deviations. Tolerance grades are represented by numbers; the lower the number the smaller the tolerance. Grade 6 is used for a medium tolerance quality and a normal length of thread engagement. Grades lower than 6 are intended for fine tolerance quality and/or short lengths of thread engagement. The recommended thread fit between the body 91 and the retention knob 92 is defined as the standard fit with thread tolerance classes 6H and 6g in the Metric Thread System.

However, the retention knob 92 is connected to the body 91 by means of a threaded engagement between the internal and external threaded segments 911, 923 in a standard fit. The gap between the external and internal threads causes the following problems. When tightening torque between the body 91 and the retention knob 92 is too small, the connection between the body 91 and the retention knob 92 is unstable, and vibrations and loosening will occur. When the body 91 and the retention knob 92 are over tightened, distorted connection and eccentricity will be caused by the gap between external and internal threads. The cutter holder will have poor balance and vibration problems during rapid spinning, and machining accuracy of the machining tool is reduced.

To overcome the shortcomings, the present invention tends to provide a cutter holder to mitigate or obviate the aforementioned problems.

SUMMARY OF THE INVENTION

The main objective of the invention is to provide a cutter holder that has a retention knob and a body connected firmly to reduce vibrations during rapid spinning to improve precision of machining.

A cutter holder has a body and a retention knob. The body has a connecting hole axially formed in the body and having an opening formed in an end of the body. The body has an internal threaded segment and a straight segment. The internal threaded segment is formed around the connecting hole in a position away from the end of the body. The straight segment is formed between the internal threaded segment and the end of the body and is coaxial with the internal threaded segment.

The retention knob is connected to the body and has a head, an abutting portion, and an external threaded portion. The head and the external threaded portion are formed on opposite ends of the retention knob. The external threaded portion is connected to the internal segment of the body by threading and has a first threaded segment, a second threaded segment, and a separating groove. The first threaded segment is formed around the external threaded portion in a position away from the head of the retention knob. The second threaded segment is formed around the external threaded portion in a position near the head of the retention knob. The separating groove is radially recessed in the external threaded portion in a position between the first threaded segment and the second threaded segment.

The abutting portion is formed between the head and the external threaded portion and has a flange, an extending portion, an annular groove, and a sealing member. The flange radially protrudes from the retention knob and has an end of the flange away from the head abutting against the end of the body. The extending portion is inserted in the connecting hole and has a clearance formed between the extending portion and the straight segment of the body. The annular groove is formed around and recessed in the extending portion. The sealing member is mounted in the annular groove and seals the clearance between the extending portion and the straight segment of the body.

The internal threaded segment, the first threaded segment, and the second threaded segment are each of a respective tolerance class according to a standard of threads. A class of thread fit between the first threaded segment of the retention knob and the internal threaded segment of the body is a standard fit in the standard of threads. The tolerance class of the second threaded segment is higher than the tolerance class of the first threaded segment.

Other objects, advantages and novel features of the invention will become more apparent from the following detailed description when taken in conjunction with the accompanying drawings.

DETAILED DESCRIPTION OF PREFERRED EMBODIMENT

Figure 1:
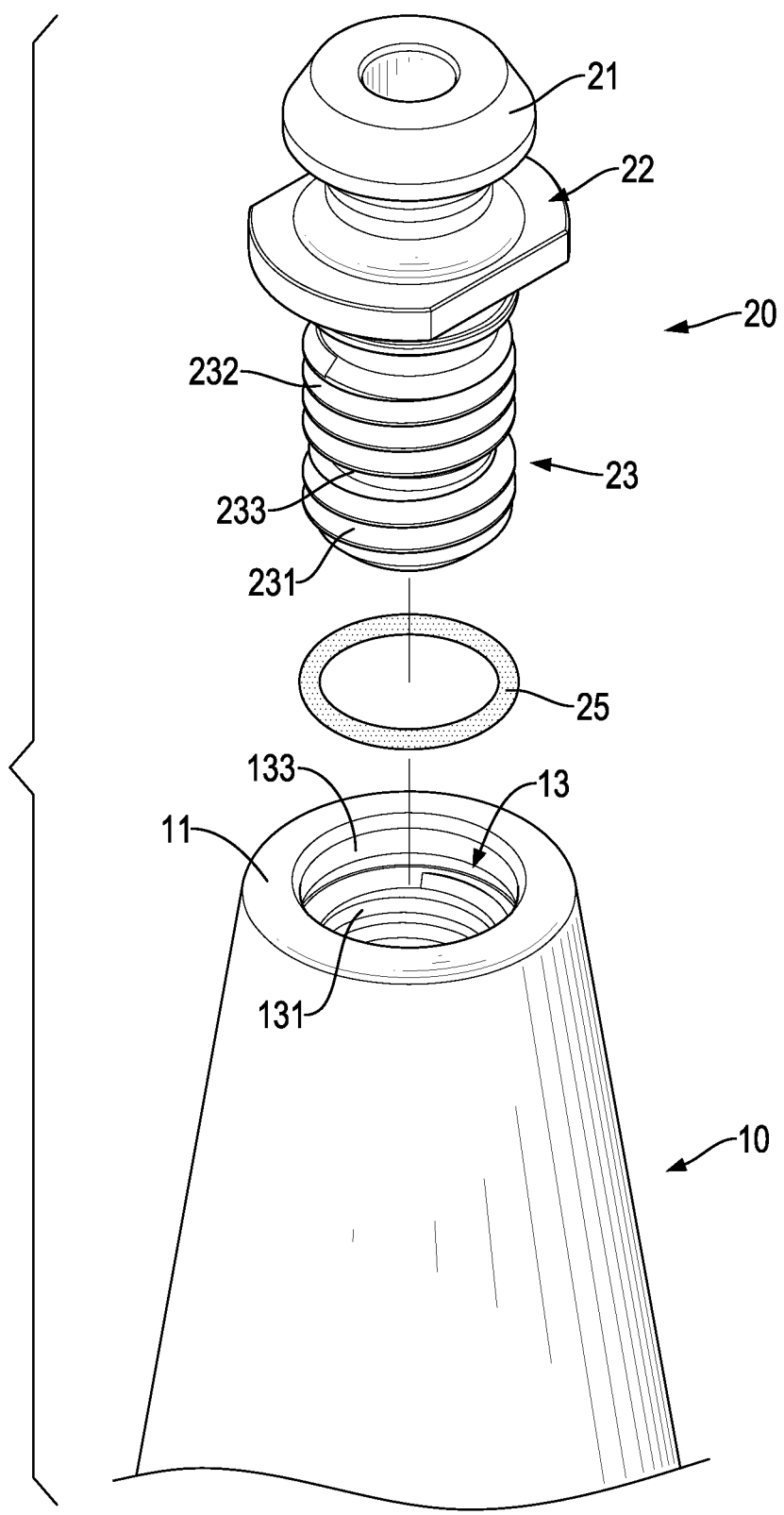
FIG. 1 is an enlarged exploded perspective view of a cutter holder in accordance with the present invention.
Figure 2:
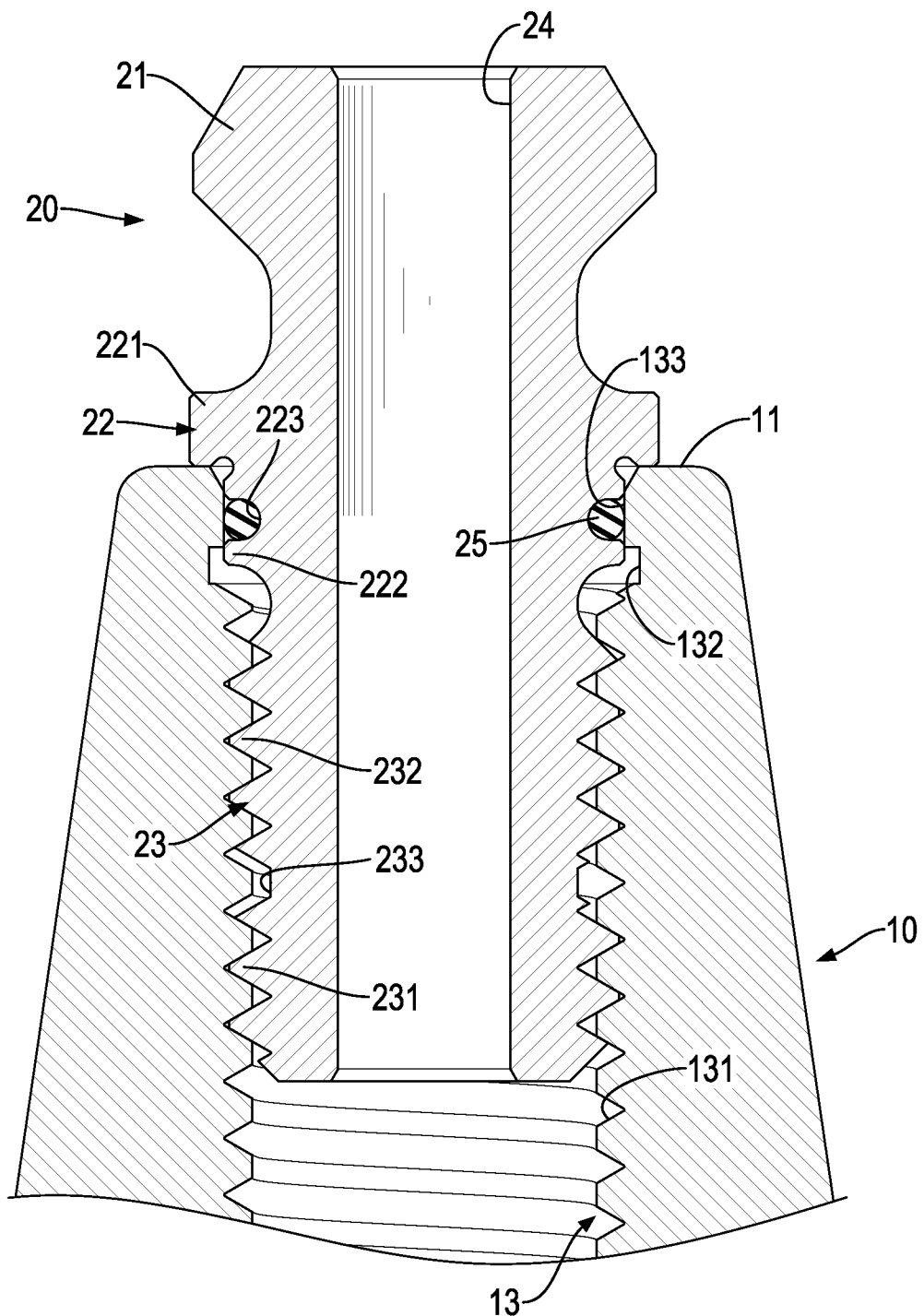
FIG. 2 is an enlarged cross sectional side view of the cutter holder in FIG. 1.

With reference to FIGS. 1 and 2, an embodiment of a cutter holder in accordance with the present invention has a body 10 and a retention knob 20. The body 10 has an end 11 and a connecting hole 13. The connecting hole 13 is axially formed in the body 10 and has an opening formed in the end 11 of the body 10. The connecting hole 13 has an internal threaded segment 131 and a straight segment 133. The internal threaded segment 131 is formed on an inner surface of the connecting hole 13 in a position away from the end 11. The internal threaded segment 131, based on Unified Inch Thread System, has a thread tolerance class 2B. The straight segment 133 is formed between the internal threaded segment 131 and the end 11 of the body 10, and is a circular hole coaxial with the internal threaded segment 131. Preferably, a recess 132 is radially recessed in the inner surface of the connecting hole 13 in a position between the internal threaded segment 131 and the straight segment 133 to optimize the processing and assembly.

Figure 5:
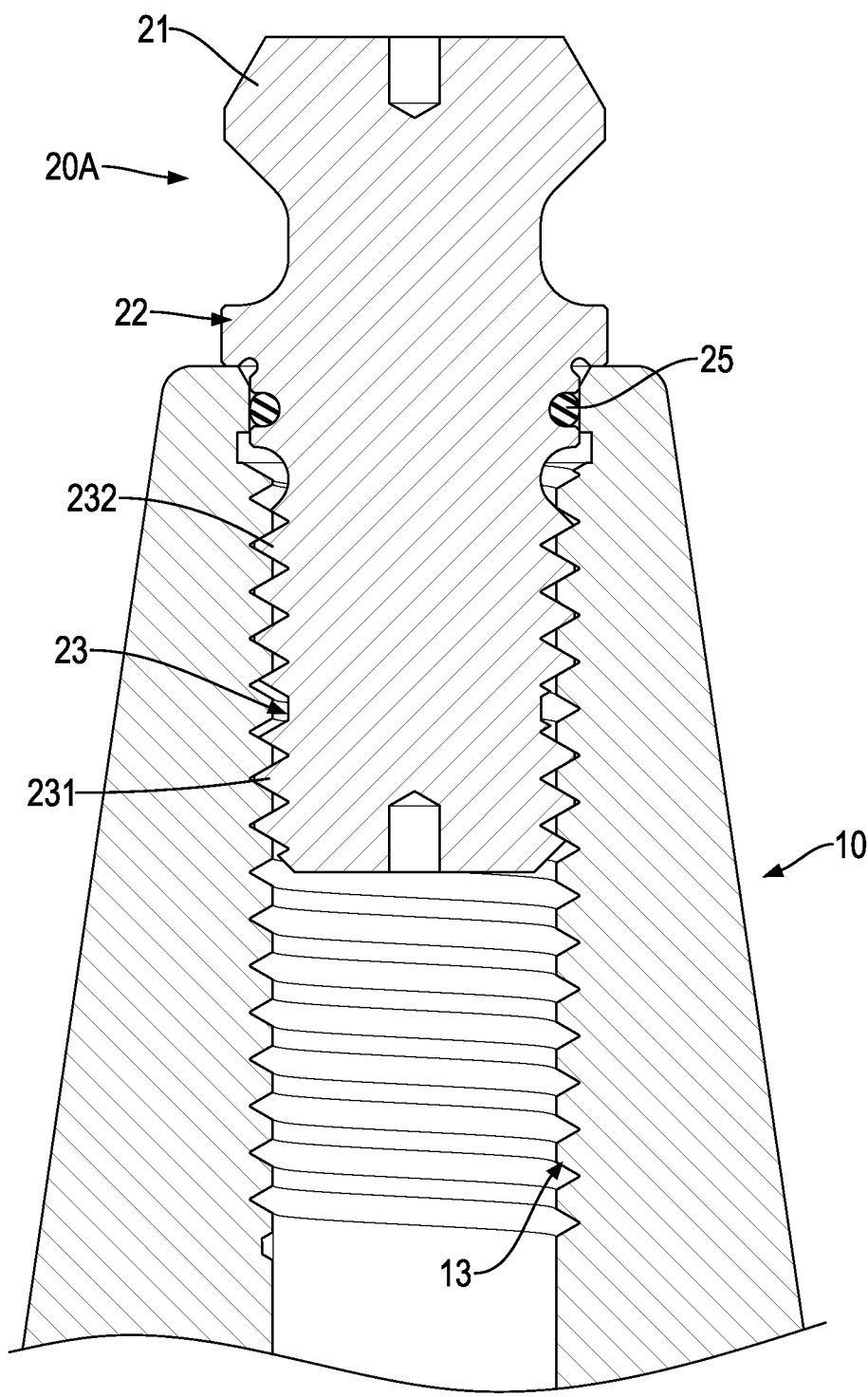
FIG. 5 is a cross sectional side view of another embodiment of a cutter holder in accordance with the present invention.
Figure 6:
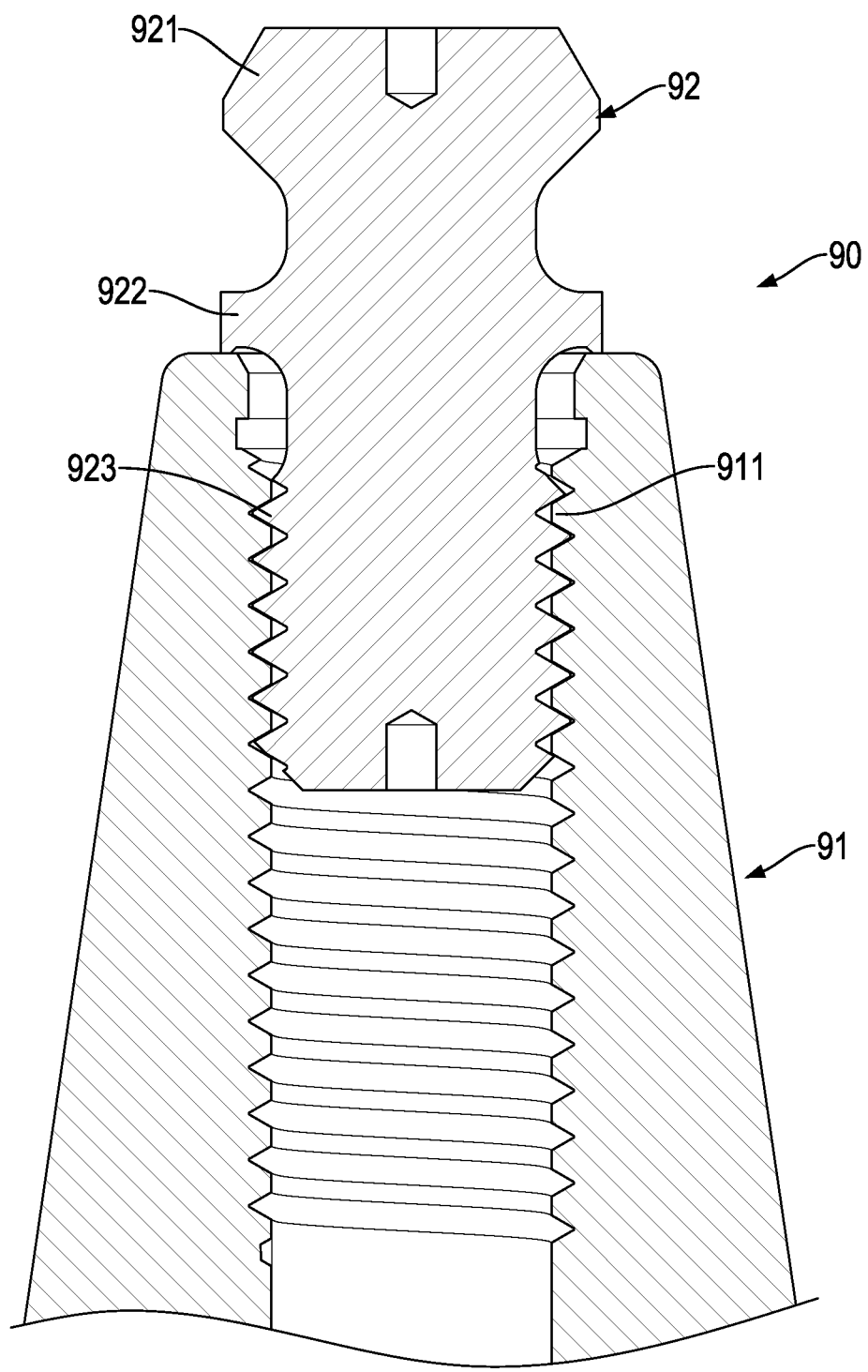
FIG. 6 is a cross sectional side view of a conventional cutter holder.
Figure 7:
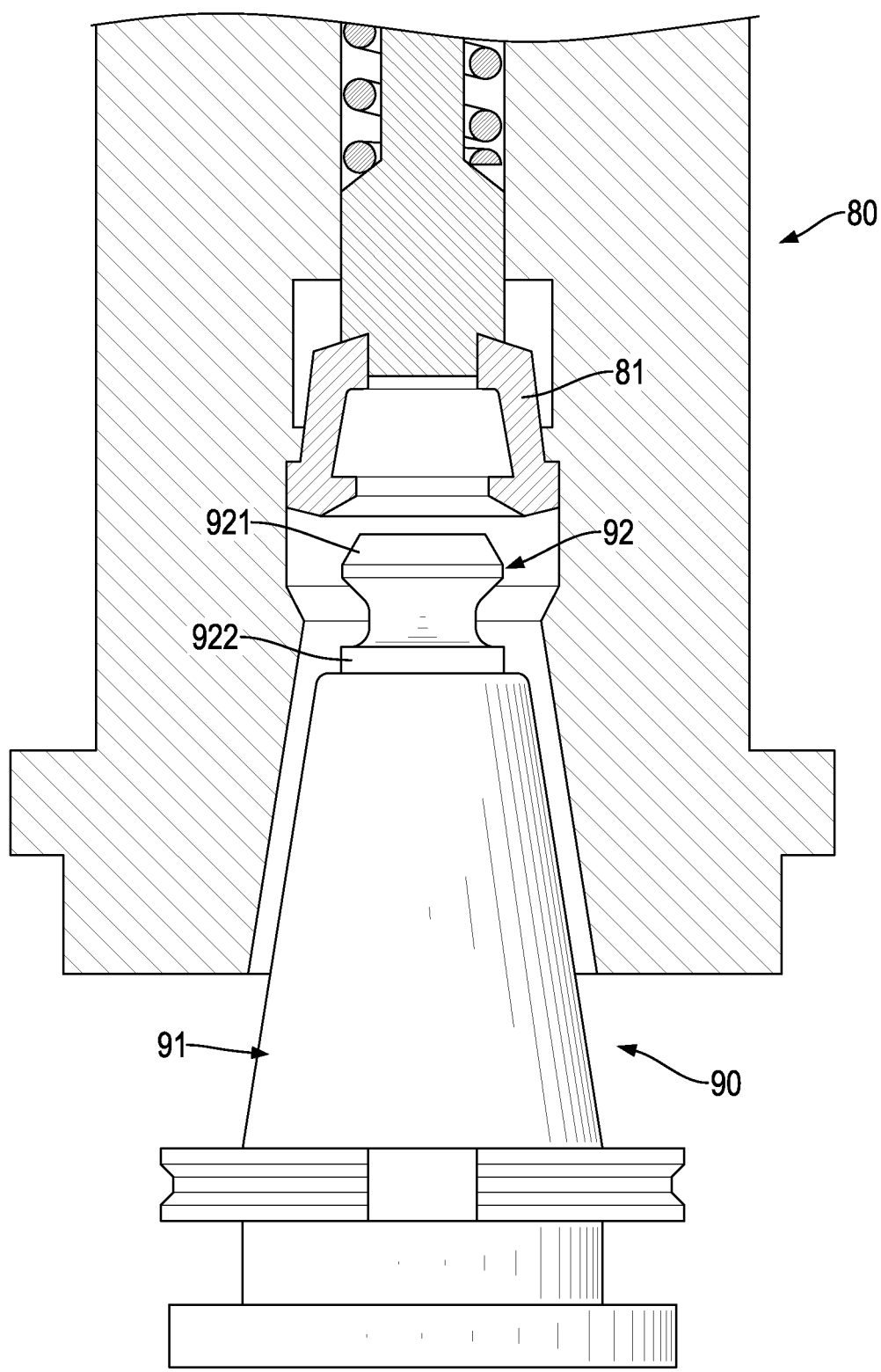
FIG. 7 is an operational side view in partial section of the conventional cutter holder in FIG. 6.

The retention knob 20 is connected to the body 10 by threading and has a head 21, an abutting portion 22, an external threaded portion 23, and a through hole 24. The head 21 and the external threaded portion 23 are formed at opposite ends of the retention knob 20, respectively. The abutting portion 22 is formed between the head 21 and the external threaded portion 23. The through hole 24 is axially formed through the retention knob 20, and is applied for coolant from a central coolant system of a machining tool to flow through to cool and lubricate the cutter. With reference to FIG. 5, in another embodiment, the retention knob 20A may have no through hole 24, and is applied to mount in a machining tool without central coolant system.

Figure 3:
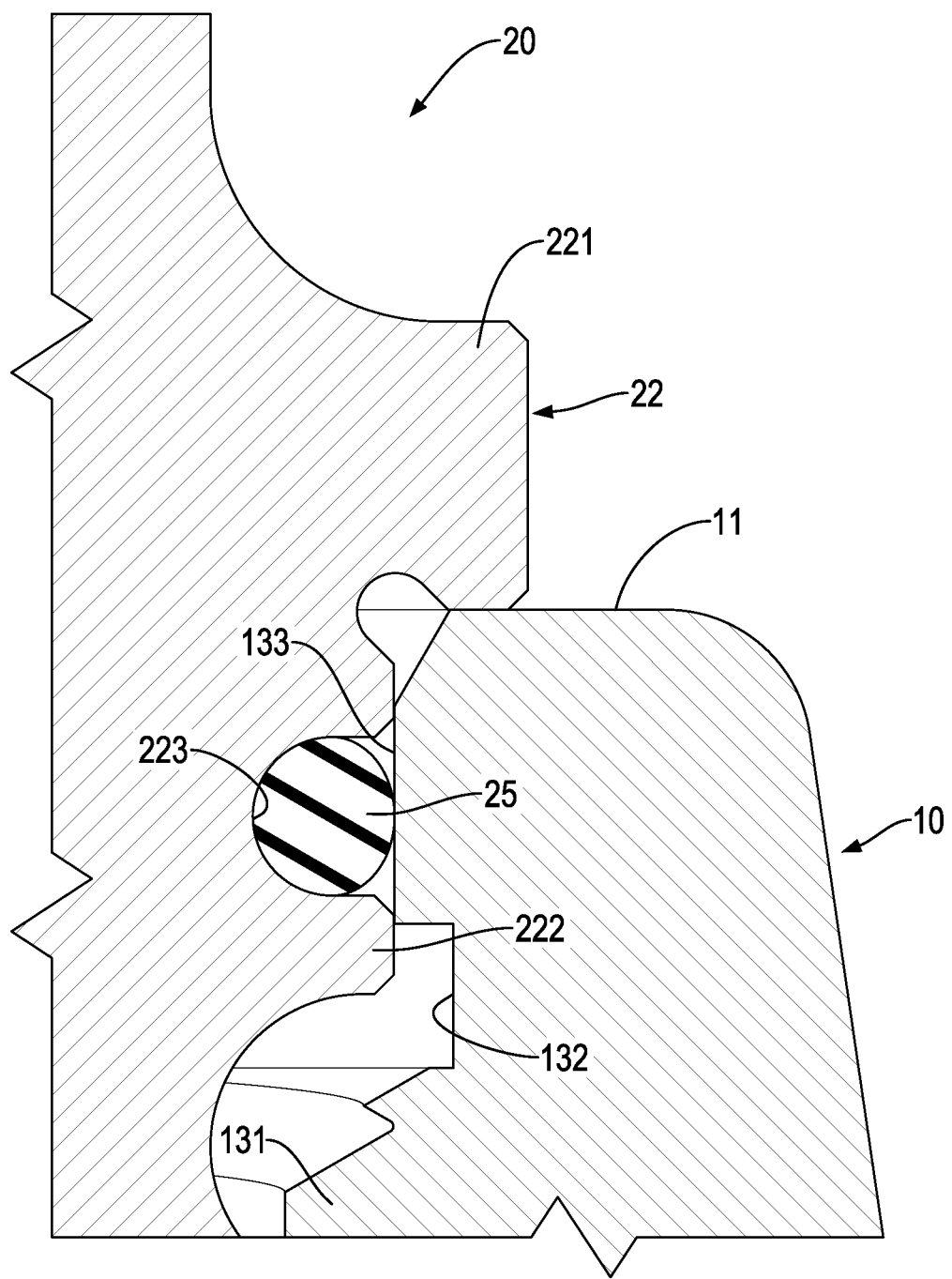
FIG. 3 is an enlarged cross sectional side view of the cutter holder in FIG. 2, showing the abutting portion of the retention knob.

With reference to FIGS. 2 and 3, the abutting portion 22 has a flange 221, an extending portion 222, an annular groove 223, and a sealing member 25. The flange 221 radially protrudes from the retention knob 20. An end of the flange 221 away from the head 21 abuts against the end 11 of the body 10. The extending portion 222 is annular, axially extends from the end of the flange 22 away from the head 21, and is inserted in the connecting hole 13 of the body 10. A diameter of the extending portion 222 is smaller than an inner diameter of the straight segment 133, and a clearance is formed between the extending portion 222 and the straight segment 133. The annular groove 223 is formed around and recessed in the extending portion 222. The sealing member 25 is an O-ring elastomer and is mounted in the annular groove 223, and an outer surface of the sealing member 25 partially protrudes from a surface of the extending portion 222 and is interfered with the straight segment 133 to seal the clearance between the extending portion 222 and the straight segment 133. With such arrangements of the abutting portion 20, the body 10 and the retention knob 20 can be connected firmly. The sealing member 25 absorbs vibrations between the body 10 and the retention knob 20, and seals the gap between the body 10 and the retention knob 20 to prevent coolant leakage.

Figure 4:
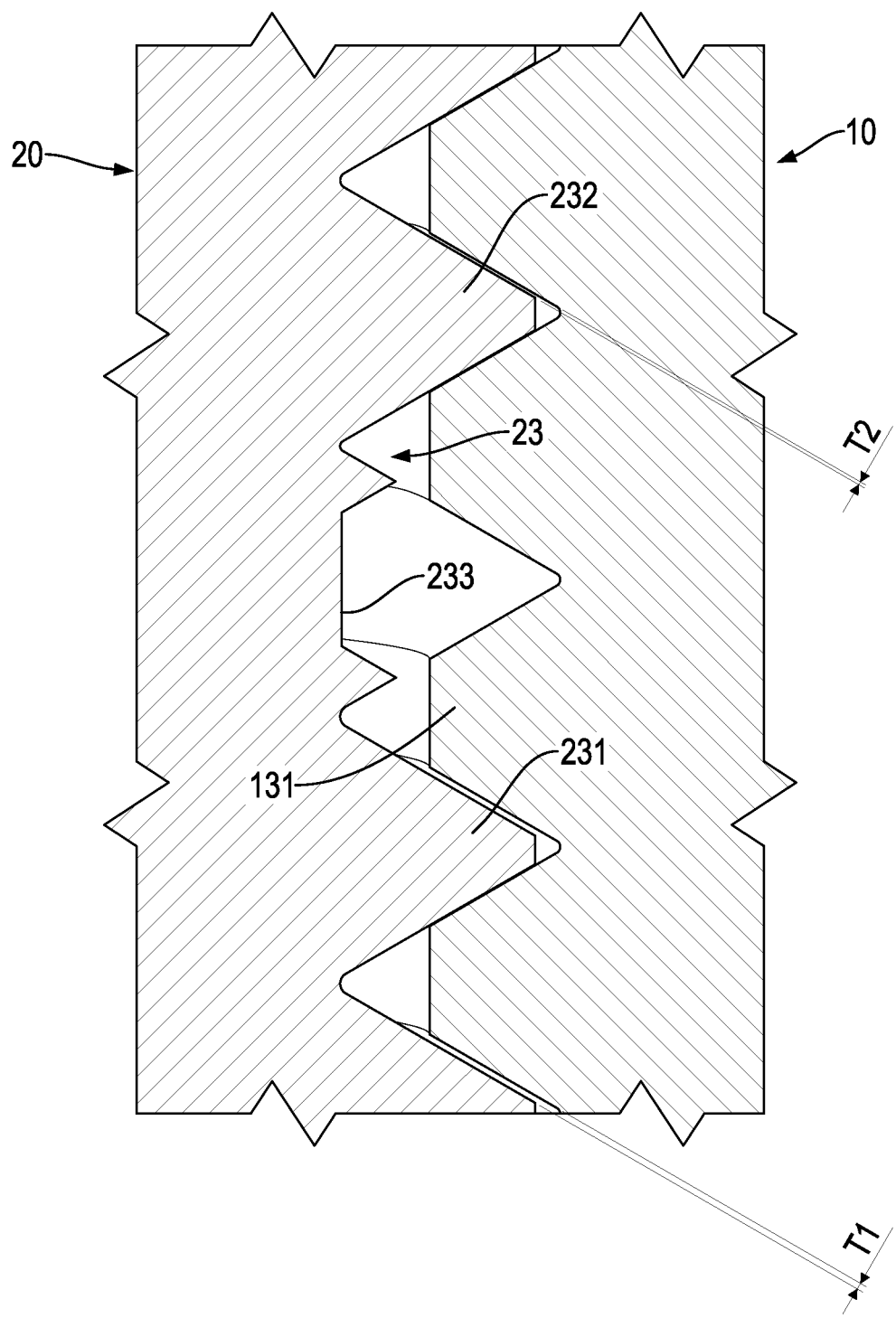
FIG. 4 is an enlarged cross sectional side view of the cutter holder in FIG. 2, showing the external threaded portion of the retention knob.

With reference to FIGS. 2 and 4, the external threaded portion 23 is engaged with the internal threaded segment 131 and has a first threaded segment 231, a second threaded segment 232, and a separating groove 233. The first threaded segment 231 is formed around the external threaded portion 23 in a position away from the head 21. The second threaded segment 232 is formed around the external threaded portion 23 in a position near the head 21. Both according to the Unified Inch Thread System, a tolerance class of the first threaded segment 231 is class 2A, and a class of thread fit between the first threaded segment 231 and the internal threaded segment 131 is the standard fit. A tolerance class of the second threaded segment 232 is class 3A in the Unified Inch Thread System, and is higher than the tolerance class of the first threaded segment 231. Thus, a clearance T2 between the second threaded segment 232 and the internal threaded segment 131 is smaller than a clearance T1 between the first threaded segment 231 and the internal threaded segment 133. The separating groove 233 is radially recessed in the external threaded portion 23 in a position between the first threaded segment 231 and the second threaded segment 232 and is applied for processing the external threaded portion 23 at different thread precisions.

In an embodiment of ⅝ inches of internal and external threads according to the Unified Inch Thread System, when the tolerance class of the internal thread is class 2B, the maximum allowance of the pitch diameter of the internal thread is 0.5732 inches with a tolerance within 0.0072 inches. When the tolerance class of the external thread is class 2A, the minimum allowance of the pitch diameter of the external thread is 0.5588 inches with a tolerance within 0.0055 inches. When the tolerance class of the external thread is class 3A, the minimum allowance of the pitch diameter of the external thread is 0.5619 inches with a tolerance within 0.0041 inches. A clearance T1 formed between pitch diameters of the internal threaded segment 131 and the first threaded segment 231 is 0.0144 inches at the maximum, 0.0017 inches at the minimum, and the tolerance is 0.0127 inches. A clearance T2 formed between pitch diameters of the internal threaded segment 131 and the second threaded segment 232 is 0.0113 inches at the maximum, 0 inch at the minimum, and the tolerance is 0.0113 inches. The threaded engagement between the second threaded segment 232 and the internal threaded segment 131 is tight. The more the retention knob 20 is screwed with the body 10, the tighter the engagement between the retention knob 20 and the body 10. The eccentricity between the retention knob 20 and the body 10 may be self-reduced during fastening. Distorted connection caused by over tension can be reduced. While rapidly spinning, the cutter holder will have good balance and the vibrations will be reduced. The machining precision processed by the cutter holder will be improved, and the life time of the cutter holder in accordance with the present invention will be increased.

Furthermore, an allowance tolerance of the second threaded segment 232 is based on the tolerance of the class 3A with an additional positive filling gap tolerance to decrease clearance between the internal threaded segment 131 and the second threaded segment 232. Thus, the clearance T2 between the second threaded segment 232 and the internal threaded segment 131 is decreased. The threaded engagement between the second threaded segment 232 and the internal threaded segment 131 will be tighter, and the eccentricity will be smaller. In the embodiment of ⅝ inches of threads according to the Unified Inch Thread System, a recommended range of the filling gap tolerance is from +0.003937 inches (about 0.1 millimeters) to +0.002362 inches (about 0.06 millimeters). The maximum clearance formed between pitch diameters of the second threaded segment 231 and the internal threaded segment 131 will be reduced to 0.0074 inches (about 0.187 millimeters).

The internal threaded segment 131 and the external threaded portion 23 may also comply with the Metric Thread System. The class of thread fit between the first threaded segment 231 and the internal threaded segment 131 is the standard fit of the Metric Thread System. The tolerance class of the internal threaded segment 131 is class 6H in the Metric Thread System. The tolerance class of the first threaded segment 231 is class 6g in the Metric Thread System, when the diameter of the first threaded segment 231 is larger than or equal to 1.6 mm. The tolerance class of the first threaded segment 231 is class 6h in the Metric Thread System, when the diameter of the first threaded segment 231 is smaller than or equal to 1.4 mm. The tolerance class of the second threaded segment 232 is class 4h in the Metric Thread System. Thus, the clearance T2 between the second threaded segment 232 and the internal threaded segment 131 is smaller than the clearance T1 between the first threaded segment 231 and the internal threaded segment 133. Furthermore, the allowance tolerance of the second threaded segment 232 is based on the tolerance of the class 4h with an additional positive filling gap tolerance to decrease clearance between the internal threaded segment 131 and the second threaded segment 232. The recommended range of the filling gap tolerance may be from +0.1 millimeters to +0.06 millimeters.

Preferably, the engagement length of the first threaded segment 231 and the second threaded segment 232 of the external threaded portion 23 engaged with the internal threaded segment 131 is greater than or equal to a recommended engagement length of threads according to the standard of the conventional cutter holder. So sufficient strength of engagement between the body 10 and the retention knob 20 is provided. The length between the end of the flange 221 away from the head 21 and the end of the retention knob 20 away from the head 21 of the present invention is longer than the length between the end of the flange away from the head and the end of the retention knob away from the head of the conventional retention knob with the same thread specifications.

With such arrangements, the sealing member 25 can eliminate clearance between the body 10 and the retention knob 20 to enhance a firm connection of the body 10 and the retention knob 20, to absorb vibrations between the body 10 and the retention knob 20, and to prevent coolant leakage. The external threaded portion 23 of the retention knob 20 has threaded segments of two tolerance classes to increase tightness of the engagement between the body 10 and the retention knob 20. The eccentricity between the retention knob 20 and the body 10 may be reduced during thread tightening. While rapidly spinning, the cutter holder has a good balance and the vibrations will be reduced. The machining accuracy processed by the cutter holder will be improved, and the operating life time of the cutter holder in accordance with the present invention will be prolonged.

What is claimed is:

1. A cutter holder comprising:
   a body having
      an end; and
      a connecting hole axially formed in the body and having
         an opening formed in the end of the body;
         an internal threaded segment formed on an inner surface of the connecting hole in a position away from the end of the body; and
         a straight segment formed between the internal threaded segment of the connecting hole and the end of the body and being coaxial with the internal threaded segment; and
   a retention knob connected to the body and having
      a head formed on an end of the retention knob;
      an external threaded portion formed on an end of the retention knob opposite the head, connected to the internal threaded segment of the body by threading, and having
         a first threaded segment formed around the external threaded portion in a position away from the head;
         a second threaded segment formed around the external threaded portion in a position near the head; and
         a separating groove radially recessed in the external threaded portion in a position between the first threaded segment and the second threaded segment; and
      an abutting portion formed between the head and the external threaded portion and having
         a flange radially protruding from the retention knob and having an end being away from the head of the retention knob and abutting against the end of the body;
         an extending portion inserted in the connecting hole of the body and having a clearance formed between the extending portion and the straight segment of the body;
         an annular groove formed around and recessed in the extending portion; and
         a sealing member mounted in the annular groove and sealing the clearance between the extending portion and the straight segment of the body, wherein
      the internal threaded segment of the body, the first threaded segment, and the second threaded segment of the retention knob are each of a respective tolerance class according to a standard of threads;
      a class of thread fit between the first threaded segment of the retention knob and the internal threaded segment of the body is of a standard fit according to the standard of threads; and
      the tolerance class of the second threaded segment is higher than the tolerance class of the first threaded segment.

2. The cutter holder as claimed in claim 1, wherein the standard of threads is the Unified Inch Thread System;
   the tolerance class of the internal threaded segment of the body is class 2B in the Unified Inch Thread System;
   the tolerance class of the first threaded segment of the retention knob is class 2A in the Unified Inch Thread System; and
   the tolerance class of the second threaded segment of the retention knob is class 3A in the Unified Inch Thread System.

3. The cutter holder as claimed in claim 2, wherein the standard of threads is the Metric Thread System;
the tolerance class of the internal threaded segment of the body is class 6H in the Metric Thread System;
the tolerance class of the first threaded segment of the retention knob is class 6g in the Metric Thread System, when a diameter of the first threaded segment is larger than or equal to 1.6 millimeters;
the tolerance class of the first threaded segment of the retention knob is class 6h in the Metric Thread System, when the diameter of the first threaded segment is less than or equal to 1.4 millimeters; and
the tolerance class of the second threaded segment of the retention knob is class 4h in the Metric Thread System.

4. The cutter holder as claimed in claim 3, wherein an allowance tolerance of the second threaded segment of the retention knob is based on the class 4h in the Metric Thread System with an additional positive filling gap tolerance.

5. The cutter holder as claimed in claim 4, wherein a range of the positive filling gap tolerance is from +0.1 millimeters to +0.06 millimeters.

6. The cutter holder as claimed in claim 5, wherein the retention knob further has a through hole formed axially in the retention knob.

7. The cutter holder as claimed in claim 4, wherein the retention knob further has a through hole formed axially in the retention knob.

8. The cutter holder as claimed in claim 3, wherein the retention knob further has a through hole formed axially in the retention knob.

9. The cutter holder as claimed in claim 2, wherein an allowance tolerance of the second threaded segment of the retention knob is based on the class 3A in the Metric Thread System with an additional positive filling gap tolerance.

10. The cutter holder as claimed in claim 9, wherein a range of the positive filling gap tolerance is from +0.1 millimeters to +0.06 millimeters.

11. The cutter holder as claimed in claim 10, wherein the retention knob further has a through hole formed axially in the retention knob.

12. The cutter holder as claimed in claim 9, wherein the retention knob further has a through hole formed axially in the retention knob.

13. The cutter holder as claimed in claim 2, wherein the retention knob further has a through hole formed axially in the retention knob.

14. The cutter holder as claimed in claim 1, wherein the body has a recess radially recessed in the connecting hole of the body in a position between the internal threaded segment and the straight segment.

15. The cutter holder as claimed in claim 14, wherein the retention knob further has a through hole formed axially in the retention knob.

16. The cutter holder as claimed in claim 1, wherein the retention knob further has a through hole formed axially in the retention knob.

* * * * *